United States Patent
Phan et al.

(10) Patent No.: US 10,159,115 B2
(45) Date of Patent: Dec. 18, 2018

(54) PANE HAVING AN ELECTRIC HEATING LAYER

(71) Applicant: SAINT-GOBAIN GLASS FRANCE, Courbevoie (FR)

(72) Inventors: Dang Cuong Phan, Aachen (DE); Bojan Dimitrijevic, Bochum (DE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 179 days.

(21) Appl. No.: 14/653,843

(22) PCT Filed: Nov. 7, 2013

(86) PCT No.: PCT/EP2013/073219
§ 371 (c)(1),
(2) Date: Jun. 18, 2015

(87) PCT Pub. No.: WO2014/095152
PCT Pub. Date: Jun. 26, 2014

(65) Prior Publication Data
US 2015/0351160 A1    Dec. 3, 2015

(30) Foreign Application Priority Data
Dec. 20, 2012   (EP) .................................. 12198362

(51) Int. Cl.
*B60L 1/02* (2006.01)
*H05B 3/06* (2006.01)
(Continued)

(52) U.S. Cl.
CPC ......... *H05B 3/84* (2013.01); *B32B 17/10036* (2013.01); *B32B 17/10192* (2013.01);
(Continued)

(58) Field of Classification Search
CPC ........ B32B 17/10036; B32B 17/10192; B32B 17/10761; H05B 2203/007;
(Continued)

(56) References Cited

U.S. PATENT DOCUMENTS

| | | | | |
|---|---|---|---|---|
| 3,794,809 A | * | 2/1974 | Beck ...................... | B32B 17/10 219/203 |
| 6,559,419 B1 | * | 5/2003 | Sol ..................... | B32B 17/10192 219/203 |

(Continued)

FOREIGN PATENT DOCUMENTS

| | | |
|---|---|---|
| CA | 2893808 A1 | 6/2014 |
| CN | 102812775 A | 12/2012 |

(Continued)

OTHER PUBLICATIONS

PCT International Search Report dated Dec. 20, 2013 for application PCT/EP2013/073219 filed on Nov. 7, 2013 in the name of Saint-Gobain Glass France.

(Continued)

*Primary Examiner* — Sang Y Paik
(74) *Attorney, Agent, or Firm* — Steinfl + Bruno LLP (57) ABSTRACT

A pane having an electric heating layer is described, including at least: a first pane having a first surface; at least one electric heating layer that is applied to at least part of the surface and has an uncoated zone; at least two busbars, provided for connection to a voltage source, which are connected to the electric heating layer such that a current path for a heating current is formed between the busbars; and at least one separating line which electrically subdivides the electric layer into at least two segments. At least one segment is arranged in the form of a strip around the uncoated zone such that the current path for the heating current is at least partially guided around the uncoated zone.

25 Claims, 8 Drawing Sheets

(51) Int. Cl.
*H05B 3/84* (2006.01)
*H05B 3/26* (2006.01)
*H05B 3/16* (2006.01)
*B32B 17/10* (2006.01)

(52) U.S. Cl.
CPC ......... *B32B 17/10761* (2013.01); *H05B 3/16* (2013.01); *H05B 3/265* (2013.01); *H05B 3/267* (2013.01); *H05B 2203/007* (2013.01); *H05B 2203/008* (2013.01); *H05B 2203/013* (2013.01); *H05B 2203/017* (2013.01); *Y10T 29/49119* (2015.01)

(58) Field of Classification Search
CPC ........ H05B 2203/008; H05B 2203/013; H05B 2203/017; H05B 3/16; H05B 3/265; H05B 3/267; H05B 3/84; Y10T 29/49119
USPC ................. 219/203, 522, 542–548
See application file for complete search history.

(56) References Cited

U.S. PATENT DOCUMENTS

| | | | |
|---|---|---|---|
| 6,891,517 B2* | 5/2005 | Voeltzel | B32B 17/10036 343/704 |
| 9,949,319 B2 | 4/2018 | Phan et al. | |
| 2004/0065651 A1 | 4/2004 | Voeltzel | |
| 2004/0200821 A1 | 10/2004 | Voeltzel | |
| 2007/0020465 A1 | 1/2007 | Thiel et al. | |
| 2011/0108537 A1* | 5/2011 | Schall | B32B 17/10036 219/201 |
| 2012/0103961 A1 | 5/2012 | Offermann et al. | |
| 2012/0193341 A1 | 8/2012 | Reul et al. | |
| 2013/0220992 A1 | 8/2013 | Lisinski et al. | |
| 2015/0334779 A1 | 11/2015 | Phan et al. | |

FOREIGN PATENT DOCUMENTS

| | | |
|---|---|---|
| DE | 3644297 A1 | 7/1987 |
| DE | 19860870 A1 | 7/2000 |
| DE | 202008017611 U1 | 4/2010 |
| EP | 0847965 A1 | 6/1998 |
| EP | 1168888 A2 | 1/2002 |
| EP | 2139049 A1 | 12/2009 |
| EP | 2200097 A1 | 6/2010 |
| EP | 2936926 A1 | 10/2015 |
| GB | 2186769 A | 8/1987 |
| GB | 2381179 A | 4/2003 |
| JP | H0986965 A | 3/1997 |
| KR | 1020120031295 A | 4/2012 |
| KR | 1020120112453 A | 10/2012 |
| WO | 03/015473 A2 | 2/2003 |
| WO | 03/024155 A2 | 3/2003 |
| WO | 2011/006743 A1 | 1/2011 |
| WO | 2012/031908 A1 | 3/2012 |
| WO | 2012/052315 A1 | 4/2012 |
| WO | 2014/095153 A1 | 6/2014 |

OTHER PUBLICATIONS

PCT International Search Report dated Dec. 20, 2013 for application PCT/EP2013/073231 filed on Nov. 7, 2013 in the name of Saint-Gobain Glass France.

PCT Written Opinion issued for PCT/EP2013/073219 filed on Nov. 7, 2013 in the name of Saint-Gobain Glass France dated Dec. 20, 2013.

International Preliminary Report on Patentability issued for PCT/EP2013/073219 filed on Nov. 7, 2013 in the name of Saint-Gobain Glass France dated Jun. 23, 2015.

PCT Written Opinion issued for PCT/EP2013/073231 filed on Nov. 7, 2013 in the name of Saint-Gobain Glass France dated Dec. 20, 2013.

International Preliminary Report on Patentability issued for PCT/EP2013/073231 filed on Nov. 7, 2013 in the name of Saint-Gobain Glass France dated Jun. 23, 2015.

Ex parte Quayle action issued for U.S. Appl. No. 14/653,847, filed Jun. 18, 2015 on behalf of Saint-Gobain Glass France. dated May 10, 2017. 9 pages.

Notice of Allowance issued for U.S. Appl. No. 14/653,847, filed Jun. 18, 2015 on behalf of Saint-Gobain Glass France. dated Aug. 21, 2017. 5 pages.

Corrected Notice of Allowability issued for U.S. Appl. No. 14/653,847, filed Jun. 18, 2015 on behalf of Saint-Gobain Glass France. dated Sep. 8, 2017. 4 pages.

Notice of Allowance issued for U.S. Appl. No. 14/653,847, filed Jun. 18, 2015 on behalf of Saint-Gobain Glass France. dated Nov. 2, 2017. 6 pages.

Notice of Allowance for U.S. Appl. No. 14/653,847, filed Jun. 18, 2015 on behalf of Saint-Gobain Glass France. dated Mar. 1, 2018. 6 pages.

Corrected Notice of Allowance for U.S. Appl. No. 14/653,847, filed Jun. 18, 2015 on behalf of Saint-Gobain Glass France. dated Mar. 8, 2018. 3 pages.

* cited by examiner

PRIOR ART

PRIOR ART

PANE HAVING AN ELECTRIC HEATING LAYER

CROSS REFERENCE TO RELATED APPLICATIONS

The present application is the US national stage of International Patent Application PCT/EP2013/073219 filed internationally on Nov. 7, 2013 which, in turn, claims priority to European Patent Application No. 12198362.1 filed on Dec. 20, 2012.

The invention relates to a pane having an electric heating layer, a method for its production, and its use.

BACKGROUND OF THE INVENTION

The field of vision of a motor vehicle window, in particular a windshield, must be kept free of ice and condensation. In the case of motor vehicles with an internal combustion engine, a stream of air heated by engine heat can, for example, be directed to the windows.

Alternatively, the window can have an electrical heating function. Thus, composite glass panes that have a transparent, electrically conductive coating on an interior-side surface of one of the individual panes are known. Using an external voltage source, an electric current that heats the coating and, with it, the pane can be conducted through the electrically conductive coating. WO2012/052315 A1 discloses, for example, such a heatable, electrically conductive coating based on metal.

The electrical contacting of the electric heating layer is typically done via busbars, as is known from US 2007/0020465 A1. The busbars are made, for example, from a printed and fired silver paste. The busbars typically run along the upper and lower edge of the pane. The busbars collect the current that flows through the electrically conductive coating and conduct it to external feed lines that are connected to a voltage source.

The patterning of the electric heating layer by separating lines or separating zones for the formation of a usually winding current path is known from the industrial series production of panes with electrical heating layers. This has the advantage that the electrical resistance can be increased and the current path can be contacted by relatively small connection electrodes. In the patent literature, such a surface heater is described, for example, in the German published patent application DE 19860870 A1.

Panes having an electric heating layer shield relatively strongly against electromagnetic radiation such that, in particular in motor vehicles with a heatable windshield, radio data traffic can be significantly impaired. Heatable windshields are, consequently, frequently provided with uncoated and thus coating-free zones ("communication windows"). The uncoated zones are readily permeable at least for specific ranges of the electromagnetic spectrum and, in this manner, enable trouble-free data traffic through the pane. The uncoated zones, on which electronic devices, such as sensors, cameras, and the like, are situated, are often arranged in the vicinity of the upper edge of the pane where they can be readily concealed by the upper masking strip.

However, uncoated zones negatively affect the electrical properties of the heating layer, which at least locally affects the current density distribution of the heating current flowing through the heating layer. In fact, they cause a highly inhomogeneous heating power distribution, with the heating power significantly reduced below and in the vicinity of the uncoated zones. On the other hand, spots with a particularly high current density develop, in which the heating power is greatly increased. As a consequence, very high local pane temperatures which constitute a risk of burns can occur and impose high thermal stresses on the panes. In addition, this can cause loosening of bonding sites of attachments.

BRIEF SUMMARY OF THE INVENTION

The object of the present invention consists in providing an improved pane having an electric heating layer as well as an uncoated zone and at least approximately uniform heating power distribution, which is simple and economical to produce.

The object of the present invention is accomplished according to the invention by a pane having an electric heating layer in accordance with claim 1. Preferred embodiments emerge from the subclaims.

The pane according to the invention having an electric heating layer comprises at least the following features:
  a first pane with a surface,
  at least one electric heating layer made of an electrically conductive coating to heat the first pane, which is arranged on at least a part of the surface and includes at least one uncoated zone,
  at least two busbars provided for connection to a voltage source, which are connected to the electric heating layer such that a current path for a heating current is formed between the busbars, and
  at least one separating line, which electrically subdivides the electric heating layer into at least two segments,
wherein at least one segment and in particular the segment immediately adjacent the uncoated zone, is arranged in strip form at least partially around the uncoated zone such that the current path for the heating current is guided at least partially around the uncoated zone.

The current path is guided, in particular in the regions above and/or below the uncoated zone, with "above" and "below" relative in each case to the direction of the current path, i.e., the shortest connection between the busbars.

The electric heating layer includes at least one uncoated zone. This means that the uncoated zone is completely or partially surrounded by the electric heating layer. The uncoated zone can, in particular, border an edge region of the electric heating layer or be extended via an uncoated strip beyond the edge region of the electric heating layer.

Panes having an electric heating layer and an uncoated zone according to the prior art without separating lines usually have very inhomogeneous heating power distribution. They have, during heating, regions with low temperature, especially in regions above and/or below the uncoated zone.

The invention is based on the recognition of the fact that optimization of the current path can be obtained by means of separating lines. Through the formation of at least one segment according to the invention that is arranged in strip form around a part of the uncoated zone, the current path can be guided into the regions having a lower temperature. This results in a more homogeneous heating power distribution and temperature distribution.

The invention is more effective the larger the uncoated zone and the more segments according to the invention are formed by separating lines. In an advantageous embodiment, the electric heating layer has at least two separating lines and preferably 4 to 30 separating lines, which form segments that are arranged at least partially in strip form around the uncoated zone. As investigations of the inventors revealed, roughly 10 separating lines that run on both sides, for example, of an uncoated zone arranged centrally inside a heating layer suffice to obtain adequate homogenization of the heating power distribution. At the same time, the patterning effort for introduction of the separating lines remains temporally and financially acceptable.

At the same time, the separating lines must be implemented particularly thin in order to negatively affect vision through the pane as little as possible. In another advantageous embodiment of the pane according to the invention, width d of the separating line is from 30 μm to 200 μm and preferably from 70 μm to 140 μm. This has the particular advantage that separating lines with such a small width negatively affect vision through the pane only very little or not at all.

In another advantageous embodiment of the pane according to the invention, the width of the segment between the uncoated zone and the nearest separating line and/or between two adjacent separating lines is from 1 cm to 15 cm. This makes it possible to obtain a particularly advantageous improvement of the homogeneity of the heating power distribution of the electric heating layer.

In another advantageous embodiment of the pane according to the invention, the area of the uncoated zone is from 0.5 dm$^2$ to 15 dm$^2$ and preferably from 2 dm$^2$ to 8 dm$^2$. Panes according to the prior art without separating lines according to the invention and with uncoated zones of this magnitude present particularly inhomogeneous heating power distributions and can be only inadequately freed of ice, snow, and condensation under poor weather conditions. Through the use of separating lines according to the invention, a particularly high and advantageous improvement of the heating characteristics of the pane can be obtained with such large uncoated zones.

In another advantageous embodiment of the pane according to the invention, the average length of each of the segments deviates by less than 25%, preferably by 0% to 10% and particularly preferably by 0% to 5% from the mean of the average lengths. The average length of a segment describes the average length of the segment in the direction of the current path, which flows through the segment upon application of a voltage. The mean of the average length is obtained by addition of all average lengths and subsequent division by the number of segments.

In a particularly advantageous embodiment, all average lengths of the segments have roughly the same length. Since the average length also depends on the curvature of the segment, to obtain improved heating characteristics, it can be advantageous to shorten the current path through the segment by means of additional busbars or low-impedance bridges.

In another advantageous embodiment of the pane according to the invention, a third busbar is arranged in electrical contact with the first busbar or second busbar, which shortens the length of the current path in at least one segment, preferably in all segments, compared to the current path outside the segments and separating lines. For this, a third busbar can contact multiple segments or all segments. By means of the third busbar, for example, the average length of the respective segment is shortened.

Alternatively, each segment can have its own additional busbar. The resistance of the additional busbar can be adapted through width, thickness, and shape such that each segment can be impinged upon by a defined voltage and this yields a particularly favorable heating power distribution.

The width of the first and second busbar is preferably from 2 mm to 30 mm, particularly preferably from 4 mm to 20 mm, and in particular from 10 mm to 20 mm. Thinner busbars result in an excessively high electrical resistance and thus in an excessively high heating of the busbar during operation. Moreover, thinner busbars are difficult to produce using printing techniques such as screen printing. Thicker busbars require an undesirably high use of material. Moreover, they result in an excessively large and unaesthetic reduction in the region of the pane that can be seen through. The length of the busbar is governed by the dimension of the electric heating layer. In the case of a busbar that is typically implemented in the form of a strip, the longer of its dimensions is referred to as length and the less long of its dimensions is referred to as width. The third busbars or additional busbars can also be implemented thinner, preferably from 0.6 mm to 5 mm.

The first and the second busbars are preferably arranged along a side edge on the electrically conductive coating and run, in particular, virtually parallel to each other. The length of the busbar is typically substantially equal to the length of the side edge of the electric heating layer, but can also be slightly larger or smaller. Also, more than two busbars can be arranged on the electrically conductive coating, preferably in the edge region along two opposite side edges of the electric heating layer. Even more than two busbars can be arranged on the electric heating layer, for example, around two or more independent heating fields.

In an advantageous embodiment, the busbar according to the invention is implemented as a printed and fired conductive structure. The printed busbar preferably contains at least one metal, a metal alloy, a metal compound, and/or carbon, particularly preferably a noble metal, in particular, silver. The printing paste preferably contains metallic particles, metal particles, and/or carbon and, in particular, noble metal particles such as silver particles. Electrical conductivity is preferably obtained by means of the electrically conductive particles. The particles can be situated in an organic and/or an inorganic matrix such as pastes or inks, preferably as printing paste with glass frits.

The layer thickness of the printed busbar is preferably from 5 μm to 40 μm, particularly preferably from 8 μm to 20 μm, and most particularly preferably from 8 μm to 12 μm. Printed busbars with these thicknesses are technically simple to realize and have an advantageous current-carrying capacity.

The specific resistance $\rho_a$ of the busbar is preferably from 0.8 μohm·cm to 7.0 μohm·cm and particularly preferably from 1.0 μohm·cm to 2.5 μohm·cm. Busbars with specific resistances in this range are technically simple to realize and have an advantageous current-carrying capacity.

Alternatively, however, the busbar can also be implemented as a strip of an electrically conductive foil. In that case, the busbar contains, for example, at least aluminum, copper, tinned copper, gold, silver, zinc, tungsten, and/or tin or alloys thereof. The strip preferably has a thickness from 10 μm to 500 μm, particularly preferably from 30 μm to 300 μm. Busbars made of electrically conductive foils with these thicknesses are technically simple to realize and have an advantageous current-carrying capacity. The strip can be electrically conductively connected to the electrically conductive structure, for example, via a soldering compound, via an electrically conductive adhesive, or by direct placement.

In another advantageous embodiment of the pane according to the invention, the electrical resistance along the current path is reduced by a low-impedance bridge in at least one segment. The low-impedance bridge has a lower sheet resistance than the material of the electric heating layer. The low-impedance bridge is preferably made of the material of the busbar and is preferably also printed. The low-impedance bridge is not necessarily electrically connected directly to one of the busbars, but can be connected to the busbars merely via the electric heating layer. By means of the low-impedance bridges, the current path and the voltage drop within a segment can be controlled such that the heating properties of the pane can be specifically improved.

The pane according to the invention includes a first pane, on which an electric heating layer is arranged. Depending on the material of the electric heating layer, it can be advantageous to protect the heating layer with a protective layer, for example, a lacquer, a polymer film, and/or a second pane.

In an advantageous embodiment of the pane according to the invention, the surface of the first pane, on which the electric heating layer is arranged, is areally bonded to a second pane via a thermoplastic intermediate layer.

Basically, all electrically insulating substrates that are thermally and chemically stable as well as dimensionally stable under the conditions of production and use of the pane according to the invention are suitable as the first and, optionally, the second pane.

The first pane and/or the second pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The first pane and/or the second pane are preferably transparent, in particular for the use of the pane as a windshield or rear window of a motor vehicle or other uses in which high light transmittance is desired. In the context of the invention, "transparent" means a pane that has transmittance of more than 70% in the visible spectral range. For panes, that are not situated in the traffic-relevant field of vision of the driver, for example, for roof panes, the transmittance can, however, also be much lower, for example, more than 5%.

The thickness of the pane can vary widely and thus be ideally adapted to the requirements of the individual case. Preferably, panes with the standard thicknesses from 1.0 mm to 25 mm, preferably from 1.4 mm to 2.5 mm, are used for motor vehicle glass and preferably from 4 mm to 25 mm for furniture, devices, and buildings, in particular for electric heaters. The size of the pane can vary widely and is determined by the size of the use according to the invention. The first pane and, optionally, the second pane have, for example, in the automobile sector and the architectural sector, customary areas from 200 cm$^2$ all the way to 20 m$^2$.

The pane can have any three-dimensional shape. Preferably, the three-dimensional shape has no shadow zones such that it can, for example, be coated by cathode sputtering. Preferably, the substrates are planar or slightly or greatly curved in one or a plurality of spatial directions. In particular, planar substrates are used. The panes can be colorless or tinted.

Multiple panes are bonded to each other by at least one intermediate layer. The intermediate layer preferably contains at least one thermoplastic polymer, preferably polyvinyl butyral (PVB), ethylene vinyl acetate (EVA), and/or polyethylene terephthalate (PET). The thermoplastic intermediate layer can, however, also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylenes, polyvinyl fluoride, and/or ethylene tetrafluoroethylene, or copolymers or mixtures thereof. The thermoplastic intermediate layer can be formed by one or even a plurality of thermoplastic films arranged one over another, with the thickness of a thermoplastic film being preferably from 0.25 mm to 1 mm, typically 0.38 mm or 0.76 mm.

In a composite pane according to the invention made of a first pane, an intermediate layer, and a second pane, the electric heating layer can be applied directly on the first pane or on a carrier film or on the intermediate layer itself. The first pane and the second pane have in each case an interior-side surface and an exterior-side surface. The interior-side surfaces of the first and of the second pane face each other and are bonded to each other via the thermoplastic intermediate layer. The exterior-side surfaces of the first and of the second pane face away from each other and away from the thermoplastic intermediate layer. The electrically conductive coating is applied on the interior-side surface of the first pane. Of course, another electrically conductive coating can be applied on the interior-side surface of the second pane. The exterior-side surfaces of the panes can also have coatings. The terms "first pane" and "second pane" are selected to distinguish between the two panes in a composite pane according to the invention. No statement concerning the geometric arrangement is associated with the terms. If, for example, the pane according to the invention is provided in an opening, for example, of a motor vehicle or a building, to separate the interior from the external environment, the first pane can face the interior or the external environment.

The electric heating layer contains an electrically conductive coating. Electrically conductive coatings according to the invention are known, for example, from DE 20 2008 017 611 U1, EP 0 847 965 B1, or WO2012/052315 A1. They typically contain one or more, for example, two, three, or four electrically conductive, functional layers. The functional layers preferably contain at least one metal, for example, silver, gold, copper, nickel, and/or chromium or a metal alloy. The functional layers particularly preferably contain at least 90 wt.-% of the metal, in particular at least 99.9 wt.-% of the metal. The functional layers can be made of the metal or the metal alloy. The functional layers particularly preferably contain silver or a silver-containing alloy. Such functional layers have a particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, an advantageously high transmittance in the visible spectral range and a particularly advantageous electrical conductivity are obtained.

Typically, at least one dielectric layer is arranged, in each case, between two adjacent functional layers of the heatable coating. Preferably, another dielectric layer is arranged below the first and/or above the last functional layer. A dielectric layer contains at least one individual layer made of a dielectric material, for example, containing a nitride such as silicon nitride or an oxide such as aluminum oxide. Dielectric layers can, however, also include multiple individual layers, for example, individual layers of a dielectric material, smoothing layers, matching layers, blocker layers, and/or anti-reflection layers. The thickness of a dielectric layer is, for example, from 10 nm to 200 nm.

This layer structure is generally obtained through a sequence of deposition procedures that are performed using a vacuum method such as magnetically enhanced cathodic sputtering.

Other suitable electrically conductive coatings preferably contain indium tin oxide (ITO), fluorine-doped tin oxide ($SnO_2$:F), or aluminum-doped zinc oxide (ZnO:Al).

The electric heating layer can, in principle, be any coating that is to be electrically contacted. If the pane according to the invention is intended to enable vision through it, as is the case, for example, with panes in the window area, the electrically conductive coating is preferably transparent. The electrically conductive coating according to the invention is preferably transparent to electromagnetic radiation, particularly preferably to electromagnetic radiation of a wavelength from 300 to 1,300 nm and in particular to visible light.

In an advantageous embodiment, the electrically conductive coating is a layer or a layer structure of a plurality of individual layers with a total thickness less than or equal to 2 μm, particularly preferably less than or equal to 1 μm.

An advantageous electrically conductive coating according to the invention has a sheet resistance from 0.4 ohm/square to 10 ohm/square. In a particularly preferable embodiment, the electrically conductive coating according to the invention has a sheet resistance from 0.5 ohm/square to 1 ohm/square. Coatings with such sheet resistances are particularly well-suited for the heating of motor vehicle window panes at typical onboard voltages from 12 V to 48 V or in electric motor vehicles with typical onboard voltages of as much as 500 V.

The electric heating layer can extend over the entire surface of the first pane. Alternatively, the electric heating layer can also extend over only part of the surface of the first pane. The electric heating layer preferably extends over at least 50%, particularly preferably over at least 70%, and most particularly preferably over at least 90% of the interior-side surface of the first pane.

The electric heating layer can have one or a plurality of uncoated regions. These regions can have a particularly high transmittance for electromagnetic radiation, for example, infrared radiation, or radar waves and are known, for example, as data transmission windows or communication windows.

In an advantageous embodiment of the pane according to the invention as a composite pane, the interior-side surface of the first pane has a circumferential edge region with a width from 2 mm to 50 mm, preferably from 5 mm to 20 mm, that is not provided with the electrically conductive coating. Then, the electrically conductive coating has no contact with the atmosphere and is, in the interior of the pane, advantageously protected by the thermoplastic intermediate layer against damage and corrosion.

The busbars are electrically contacted by one or a plurality of feed lines. The feed line is preferably implemented as a flexible foil conductor (flat conductor, ribbon cable). This means an electrical conductor whose width is significantly greater than its thickness.

Such a foil conductor is, for example, a strip or band containing or made of copper, tinned copper, aluminum, silver, gold, or alloys thereof. The foil conductor has, for example, a width from 2 mm to 16 mm and a thickness from 0.03 mm to 0.1 mm. The foil conductor can have an insulating, preferably polymeric sheath, for example, polyimide-based. Foil conductors that are suitable for the contacting of electrically conductive coatings in panes have only a total thickness of, for example, 0.3 mm. Such thin foil conductors can be embedded without difficulty in the thermoplastic intermediate layer between the individual panes. A plurality of conductive layers electrically isolated from each other can be situated in a foil conductor band.

Alternatively, thin metal wires can also be used as an electrical feed line. The metal wires contain, in particular, copper, tungsten, gold, silver, or aluminum or alloys of at least two of these metals. The alloys can also contain molybdenum, rhenium, osmium, iridium, palladium, or platinum.

In an advantageous embodiment of the invention, the electrical feed line is connected to a contact strip, for example, by means of a soldering compound or an electrically conductive adhesive. The contact strip is then connected to the busbar. In the context of the invention, the contact strip is an extension of the feed line such that the connection area between the contact strip and the busbar means the connection area according to the invention beyond which the distance a runs in the extension direction of the busbar.

The contact strip advantageously increases the current-carrying capacity of the busbar. Also, undesirable heating of the the contact point between the busbar and the feed line can be prevented by the contact strip. In addition, the contact strip simplifies the electrical contacting of the busbar by the electrical feed line since the feed line does not have to be connected, for example, soldered, to the already applied busbar.

The contact strip preferably contains at least one metal, particularly preferably copper, tinned copper, silver, gold, aluminum, zinc, tungsten, and/or tin. This is particularly advantageous with regard to the electrical conductivity of the contact strip. The contact strip can also include alloys which preferably contain one or a plurality of the elements mentioned and, optionally, other elements, for example, brass or bronze.

The contact strip is preferably implemented as a strip of a thin, electrically conductive foil. The thickness of the contact strip is preferably from 10 μm to 500 μM, particularly preferably from 15 μm to 200 μm, most particularly preferably from 50 μm to 100 μm. Foils with these thicknesses are technically simple to produce and readily available and also have an advantageously low electrical resistance.

The length of the contact strip is preferably from 10 mm to 400 mm, particularly preferably from 10 mm to 100 mm and, in particular, 20 mm to 60 mm. This is particularly advantageous with regard to good handlability of the contact strip as well as an adequately large contact area for the electrical contacting between the busbar and the contact strip.

The width of the contact strip is preferably from 2 mm to 40 mm, particularly preferably from 5 mm to 30 mm. This is particularly advantageous with regard to the contact area between the contact strip and the busbar and simple connection of the contact strip to the electrical feed line. The terms "length" and "width" of the contact strip refer in each case to the dimension in the same direction indicated by "length" or "width" of the busbar.

In a preferred embodiment, the contact strip is in direct contact with the busbar over its entire surface. For this, a contact strip is placed on the busbar. The particular advantage resides in simple production of the pane and the use of the entire surface of the contact strip as the contact surface.

The contact strip can simply be placed on the busbar and is durably stably fixed in the intended position inside the laminated pane.

The invention further comprises a method for producing a pane having an electric heating layer, comprising at least:
(a) application of an electric heating layer with an uncoated zone on a surface of a first pane,
(b) application of at least two busbars provided for connection to a voltage source, which are connected to the electric heating layer such that a current path for a heating current is formed between the busbars (c) introduction of at least one separating line, which electrically subdivides the electric heating layer into at least two segments, wherein at least one segment is arranged at least partially in strip form around the uncoated zone such that the current path for the heating current is guided at least partially around the uncoated zone.

The application of the electrically conductive coating of the electric heating layer in process step (a) can be done by methods known per se, preferably by magnetically enhanced cathodic sputtering. This is particularly advantageous with regard to simple, fast, economical, and uniform coating of the first pane. However, the electrically conductive coating can also be applied, for example, by vapor deposition, chemical vapor deposition (CVD), plasma enhanced chemical vapor deposition (PECVD), or by wet chemical methods.

The first pane can be subjected to a temperature treatment after process step (a). The first pane with the electrically conductive coating is heated to a temperature of at least 200° C., preferably at least 300° C. The temperature treatment can serve to increase the transmittance and/or to reduce the sheet resistance of the electrically conductive coating.

The first pane can be bent after process step (a), typically at a temperature from 500° C. to 700° C. Since it is technically simpler to coat a flat pane, this procedure is advantageous if the first pane is to be bent. However, alternatively, the first pane can also be bent before process step (a), for example, if the electrically conductive coating is unsuited to withstand a bending process without damage.

The application of the busbar in process step (b) is preferably done by printing and firing an electrically conductive paste in a screen printing process or in an inkjet process. Alternatively, the busbar can be applied, preferably placed, soldered, or glued, on the electrically conductive coating as a strip of an electrically conductive foil.

In screen printing methods, the lateral shaping is done by masking the mesh through which the printing paste with the metal particles is pressed. By means of appropriate shaping of the masking, the width b of the busbar, for example, can be predefined and varied in a simple manner.

The decoating of individual separating lines in the electrically conductive coating is done preferably using a laser beam. Methods for patterning thin metal foils are known, for example, from EP 2 200 097 A1 or EP 2 139 049 A1. The width of the decoating is preferably 10 μm to 1000 μm, particularly preferably 30 μm to 200 μm, and in particular 70 μm to 140 μm. In this range, a particularly clean and residue-free decoating takes place using the laser beam. The decoating using a laser beam is particularly advantageous since the decoated lines are optically very inconspicuous and the appearance and the vision through the pane are negatively affected only slightly. The decoating of a line with a width that is wider than the width of a laser cut is done by repeated runs along the line with a laser beam. Consequently, the duration and costs of the process increase with increasing line width. Alternatively, the decoating can be done by mechanical ablation as well as by chemical or physical etching.

An advantageous improvement of the method according to the invention includes at least the following additional steps:

(d) arranging a thermoplastic intermediate layer on the coated surface of the first pane and arranging a second pane on the thermoplastic intermediate layer, and (e) bonding the first pane and the second pane via the thermoplastic intermediate layer.

In process step (d), the first pane is arranged such that the one of its surfaces which is provided with the electric heating layer faces the thermoplastic intermediate layer. The surface thus becomes the interior-side surface of the first pane.

The thermoplastic intermediate layer can be formed by one single thermoplastic film or by two or more thermoplastic films that are arranged areally one over another.

The bonding of the first and second pane in process step (e) is preferably done under the action of heat, vacuum, and/or pressure. Methods known per se can be used for producing a pane.

For example, so-called autoclave methods can be performed at an elevated pressure of roughly 10 bar to 15 bar and temperatures from 130° C. to 145° C. over roughly 2 hours. Vacuum bag or vacuum ring methods known per se operate, for example, at roughly 200 mbar and 80° C. to 110° C. The first pane, the thermoplastic intermediate layer, and the second pane can also be pressed in a calender between at least one pair of rollers to form a pane. Systems of this type are known for producing panes and normally have at least one heating tunnel upstream before a pressing facility. The temperature during the pressing procedure is, for example, from 40° C. to 150° C. Combinations of calendering and autoclaving methods have proven especially effective in practice. Alternatively, vacuum laminators can be used. These consist of one or a plurality of heatable and evacuable chambers in which the first pane and the second pane are laminated within, for example, roughly 60 minutes at reduced pressures from 0.01 mbar to 800 mbar and temperatures from 80° C. to 170° C.

The invention further includes the use of the pane according to the invention with electrical contacting in buildings, in particular in the access area, window area, roof area, or façade area, as a built-in component in furniture and devices, in means of transportation for travel on land, in the air, or on water, in particular in trains, boats, and motor vehicles, for example, as a windshield, rear window, side window, and/or roof pane.

The invention is explained in detail in the following with reference to drawings and exemplary embodiments. The drawings are a schematic representation and not true to scale. The drawings in no way restrict the invention.

BREIF DESCRIPTION OF THE SEVERAL VIEWS OF THE DRAWINGS

They depict.

DETAILED DESCRIPTION OF THE INVENTION

Figure 1A:
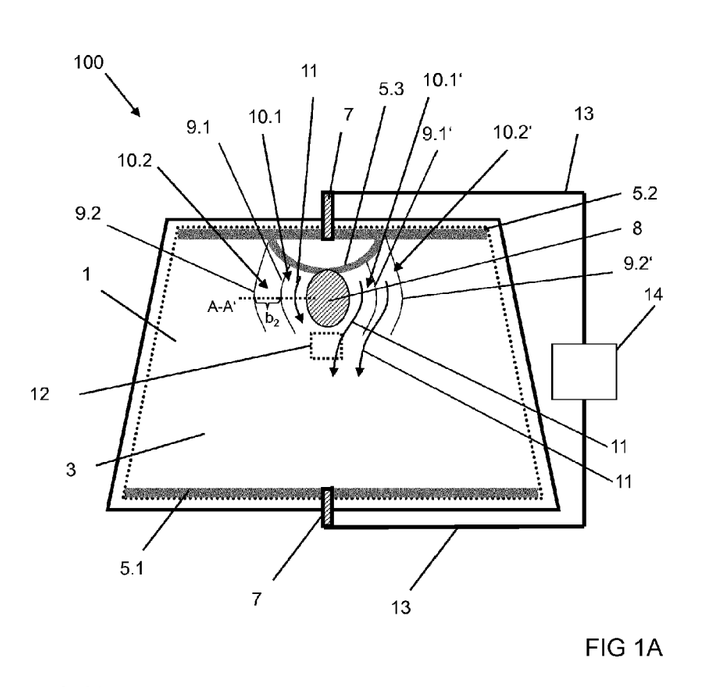
FIG. 1A a plan view of an embodiment of the pane according to the invention having an electric heating layer, FIG. 1B a cross-sectional view along the section line A-A' through the pane of FIG. 1A, FIG. 1C an enlarged view of a detail of FIG. 1A, FIG. 2A a plan view of a pane according to the prior art as a comparative example, FIG. 2B simulation of the heating power distribution of the comparative example of FIG. 2A, FIG. 2C simulation of the temperature distribution of the comparative example of FIG. 2A, FIG. 3A a plan view of another embodiment of the pane according to the invention, FIG. 3B simulation of the heating power distribution of the pane according to the invention of FIG. 3A, FIG. 3C simulation of the temperature distribution of the pane according to the invention of FIG. 3A, FIG. 4 a plan view of another embodiment of the pane according to the invention, FIG. 5 a plan view of another embodiment of the pane according to the invention, and FIG. 6 a detailed flowchart of an embodiment of the method according to the invention.
Figure 1B:
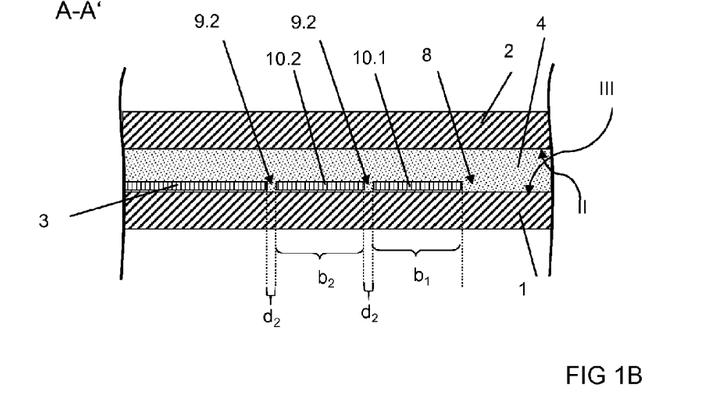

FIG. 1A depicts a plan view of an exemplary embodiment of a pane 100 according to the invention having an electric heating layer. FIG. 1B depicts a cross-section through the pane 100 according to the invention of FIG. 1A along the section line A-A'. The pane 100 comprises a first pane 1 and a second pane 2, which are bonded to each other via a thermoplastic intermediate layer 4. The pane 100 is, for example, a motor vehicle window and in particular the windshield of an automobile. The first pane 1 is, for example, intended to face the interior in the installed position. The first pane 1 and the second pane 2 are made of soda lime glass. The thickness of the first pane 1 is, for example, 1.6 mm and the thickness of the second pane 2 is 2.1 mm. The thermoplastic intermediate layer 4 is made of polyvinyl butyral (PVB) and has a thickness of 0.76 mm. An electric heating layer 3 made of an electrically conductive coating is applied on the interior-side surface III of the first pane 1. The electric heating layer 3 is a layer system that contains, for example, three electrically conductive silver layers that are separated from each other by dielectric layers. When a current flows through the electric heating layer 3, it is heated due to its electrical resistance and Joule heat development. The electric heating layer 3 can, consequently, be used for active heating of the pane 100.

The electric heating layer 3 extends, for example, over the entire surface III of the first pane 1 minus a circumferential frame-shaped uncoated region with a width of 8 mm. The uncoated region is used for the electrical insulation between the current-carrying electric heating layer 3 and the motor vehicle body. The uncoated region is hermetically sealed by gluing to the intermediate layer 4 to protect the electric heating layer 3 against damage and corrosion.

For electrical contacting, in each case, a first busbar 5.1 is arranged in the lower edge region; and another, second busbar 5.2 is arranged in the upper edge region on the electric heating layer 3. The busbars 5.1, 5.2 contain, for example, silver particles and were applied by screen printing and then fired. The length of the busbars 5.1, 5.2 corresponds to approximately the dimension of the electric heating layer 3.

When an electric voltage is applied to the busbars 5.1 and 5.2, a uniform current flows through the electric heating layer 3 between the busbars 5.1, 5.2. A feed line 7 is arranged approximately centrally on each busbar 5.1, 5.2. The feed line 7 is a foil conductor known per se. The feed line 7 is electrically conductively connected to the busbar 5.1, 5.2 via a contact surface, for example, by means of a soldering compound, an electrically conductive adhesive, or by simple placement and application of pressure inside the pane 100. The foil conductor contains, for example, a tinned copper foil with a width of 10 mm and a thickness of 0.3 mm. The busbars 5.1, 5.2 are connected via the electrical feed lines 7 via connecting cable 13 to a voltage source 14, which provides a customary onboard voltage for motor vehicles, preferably from 12 V to 15 V and, for example, roughly 14 V. Alternatively, the voltage source 14 can even have higher voltages, for example, from 35 V to 45 V, and in particular 42 V.

A third busbar 5.3 in the shape of a semicircular line that is electrically conductively connected to the second busbar 5.2 is arranged, for example, on the upper edge of the pane 100. Alternatively, the third busbar 5.3 can be implemented with a rectangular, triangular, trapezoidal, or other shape. The third busbar 5.3 has, for example, a width of 10 mm.

An uncoated zone 8 is arranged in the upper region of the pane 100 roughly centrally relative to the width of the pane. The uncoated zone 8 has no electrically conductive material of the electric heating layer 3. The uncoated zone 8 is, for example, completely surrounded by the electric heating layer 3. Alternatively, the uncoated zone 8 can be arranged at the edge of the electric heating layer 3. The area of the uncoated zone 8 is, for example, 1.5 dm$^2$. The length of the uncoated zone 8 is, for example, 18 cm. Here, the term "length" means the dimension in the direction that runs in the direction of the current path through the pane, i.e., in the direction of the shortest connecting line between the busbars 5.1, 5.2. In the example of the motor vehicle window of FIG. 1, the length of the uncoated zone 8 is arranged in the vertical direction and the width in the horizontal direction, parallel to the busbars 5.1, 5.2. The uncoated zone 8 is adjacent the busbar 5.3 on its upper end.

The busbars 5.1, 5.2, 5.3 have, in the example depicted, a constant thickness of, for example, roughly 10 μm and a constant specific resistance of, for example, 2.3 μohm·cm.

The electric heating layer 3 has four separating lines 9.1, 9.1', 9.2, 9.2', which are arranged, for example, in mirror symmetry to the uncoated zone 8. In the region of the separating lines 9.1, 9.1', 9.2, 9.2', the electric heating layer 3 is electrically interrupted. The separating lines 9.1, 9.1', 9.2, 9.2' are arranged in strip form around the uncoated zone 8 and form segments 10.1, 10.1', 10.2, 10.2', 10.3, 10.3' in the electric heating layer 3. The current paths 11 are guided around the uncoated zone 8 by the segments 10.1, 10.1', 10.2, 10.2' in the electric heating layer 3. In particular, the current paths 11 in the segments 10.1, 10.1' are guided in the immediate vicinity of the uncoated zone 8 into the region 12 below the uncoated zone 8. In this region 12, only a small heating power would be obtained in an electric heating layer 3 according to the prior art without separating lines (cf. heating power distribution according to the prior art in FIG. 2B).

FIG. 1B schematically depicts a cross-section through the pane 100 according to the invention along the section line A-A'. The separating lines 9.1, 9.1', 9.2, and 9.2' have a width $d_1$, $d_1'$, $d_2$, and $d_2'$ of, for example, 100 μm and are, for example, introduced into the electric heating layer 3 by laser patterning. Separating lines 9.1, 9.1', 9.2, 9.2' with such a small width are hardly perceptible optically and only disrupt vision through the pane 100 a little, which is of particular importance for driving safety especially for use in motor vehicles.

By means of an opaque ink layer known per se as a masking print, the region of the third busbar 5.3 can be prevented from being visible to an observer. The masking print (not shown here) can be applied, for example, on the interior-side surface II of the second pane 2 in the form of a frame.

A contact strip (not shown here) can be arranged between the feed line 7 and the busbar 5.1, 5.2. The contact strip is used for simple connection of the busbar 5.1, 5.2 to an external feed line 7 and is, for example, arranged orthogonal to the feed line 7 and in the long direction 6 of the busbar 5.1, 5.2. The contact strip advantageously increases the current-carrying capacity of the busbar 5.1, 5.2. Thus, the passage of the electrical current from the busbar 5.1, 5.2 to the feed line 7 is distributed over a larger area and local overheating, so-called hotspots, is prevented. The contact strip is in contact, for example, over its entire surface with the busbar 5.1, 5.2. The contact strip is, for example, during production of the pane 100 placed on the busbar 5.1, 5.2 and is durably stably fixed by the thermoplastic layer 4 on the busbar 5.1, 5.2. The contact strip is made, for example, of copper and has a thickness of 100 µm, a width of 8 mm, and a length of 5 cm. The contact strip and the busbar 5.1, 5.2 are preferably in direct contact. Thus, the electrical connection is not made via a soldering compound or an electrically conductive adhesive. Thus, the production process of the pane 100 is significantly simplified. In addition, the risk of damage to the busbar 5.1, 5.2, as it exists, for example, in the case of soldering or with stressing a soldered joint, can be avoided.

Figure 1C:
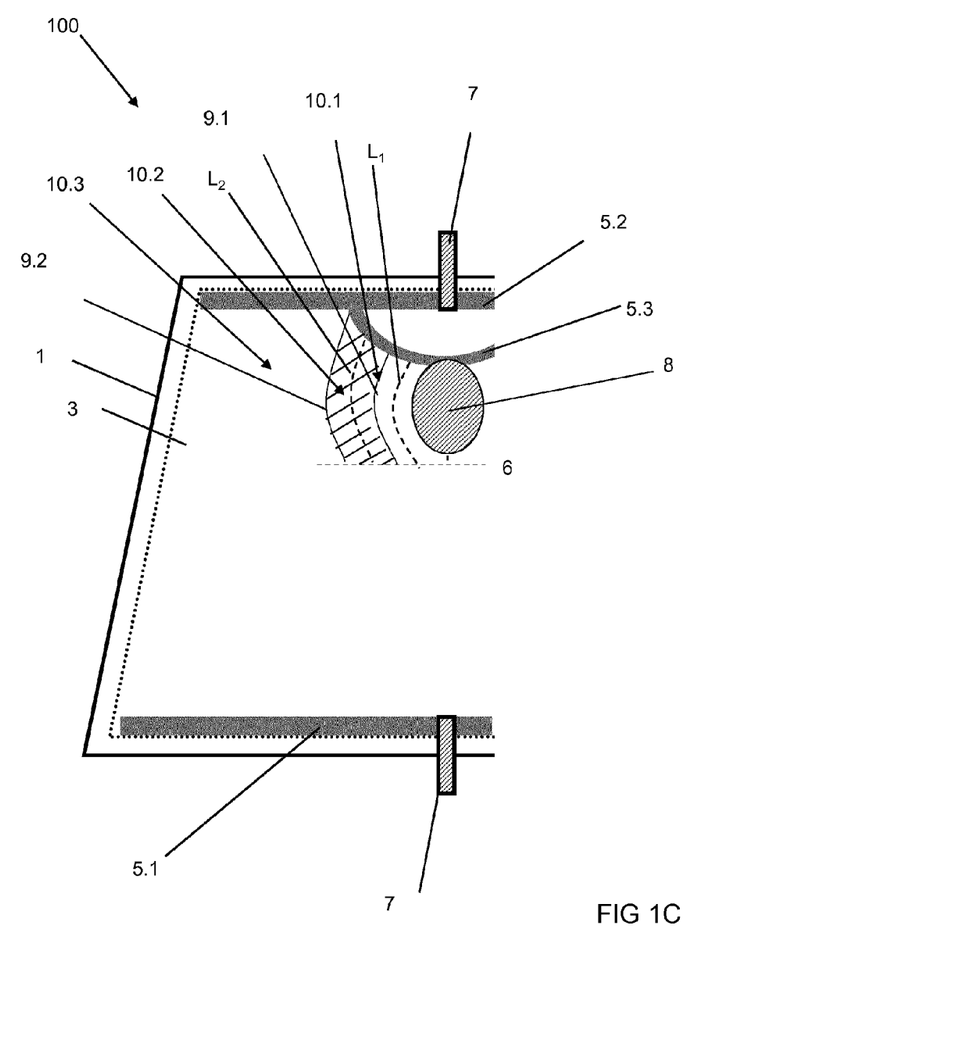

FIG. 1C depicts an enlarged view of a detail in the region of the uncoated zone 8 and of the separating lines 9.1, 9.2 that are arranged on the left side of the uncoated zone 8. The segment 10.2 between the separating lines 9.1 and 9.2 is, for example, represented by hatching. All separating lines 9.1, 9.2 terminate at the line 6 below the uncoated region 8. Furthermore, the average length $L_1$ of the segment 10.1 and the average length $L_2$ of the segment 10.2 are shown. The average length $L_1$ is, for example, 25 cm. The average length $L_2$ is, for example, 28 cm. In an advantageous embodiment of the invention, the average lengths $L_1$ and $L_2$ are implemented roughly the same. The average length L of a segment 10.1, 10.2 is generally determined by the curvature of the separating lines and thus by the curvature of the segment as well as by the position of the upper busbar 5.2 and possibly of the third busbar 5.3. An optimal average length L of the segment 10.1, 10.2 for homogeneous heating power distribution can be determined in simple experiments and simulations.

Figure 2A:
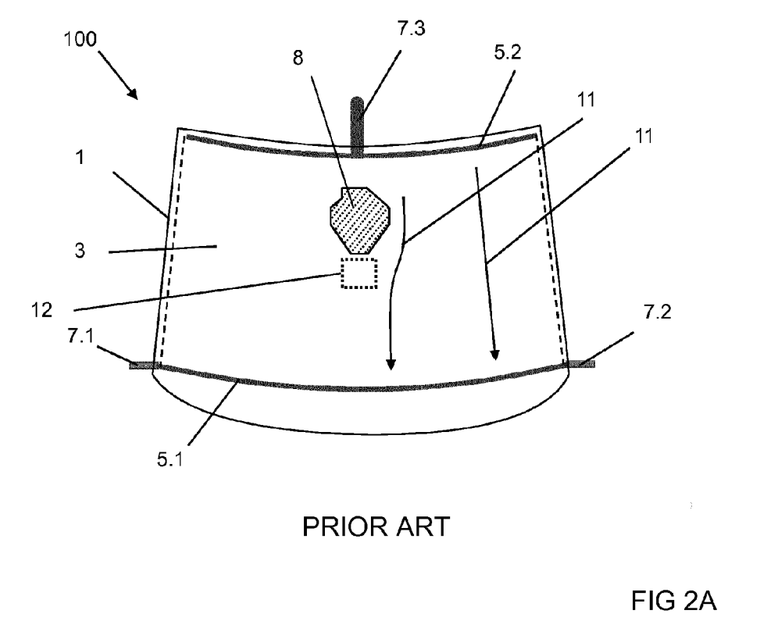

FIG. 2A depicts a pane 100 according to the prior art. The pane 100 comprises a first pane 1 and a second pane 2, which are bonded to each other via a thermoplastic intermediate layer 4. The pane 100 is, for example, a motor vehicle window and, in particular, the windshield of an automobile. The first pane 1 is, for example, intended to face the interior in the installed position. The first pane 1 and the second pane 2 are made of soda lime glass. The thickness of the first pane 1 is, for example, 1.6 mm and the thickness of the second pane 2 is 2.1 mm. The thermoplastic intermediate layer 4 is made of polyvinyl butyral (PVB) and has a thickness of 0.76 mm. An electric heating layer 3 made of an electrically conductive coating, which corresponds in structure to the electric heating layer 3 of FIG. 1A, is applied on the interior-side surface III of the first pane 1. In contrast to FIG. 1A, the busbar 5.1 arranged on the lower edge of the pane 100 has two feed lines 7.1, 7.2. The busbars 5.1, 5.2 have in each case a constant thickness of, for example, 10 µm and a constant specific resistance of, for example, 2.3 µohm·cm. Moreover, the pane 100 according to the prior art differs from the pane 100 according to the invention of FIG. 1A in that no separating lines are incorporated into the electric heating layer 3.

The area of the electric heating layer 3 is roughly 0.98 m². The electric heating layer 3 has an uncoated region 8 in the upper third of the pane and roughly centrally relative to the width of the pane. The uncoated region 8 has, for example, a maximum width of 21 cm, a maximum length of 24 cm, and a total area of 400 cm².

The pane has a busbar 5.2 on the upper edge. The current is fed into the busbar 5.2 through a feed line 7, identified by an arrow. The current flows through the electric heating layer 3 into a busbar 5.1 that is arranged in the lower region of the pane 100. The busbar 5.1 is connected on its right and its left end, respectively, to a feed line 7.1, 7.2. The busbars 5.1, 5.2 have, for example, a width of 16 mm and a thickness of 10 µm. The electric heating layer 3 has, for example, a sheet resistance of 0.9 ohm/square. For a finite element simulation, a voltage of 14 V between the lower feed lines 7.1 and 7.2 and the upper feed line 7 and an ambient temperature of 22° C. were assumed. Moreover, a heating time of 12 minutes was assumed in the simulation.

Figure 2B:
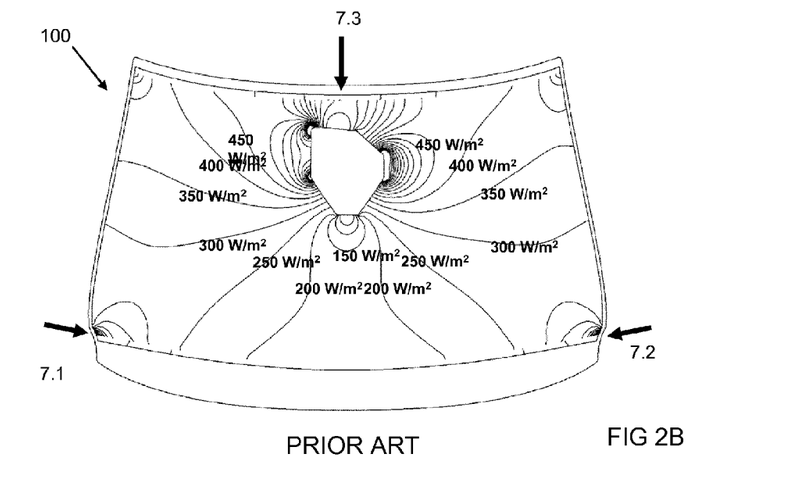

FIG. 2B depicts the simulation of the heating power distribution of the pane 100 according to the prior art of FIG. 2A without separating lines in the electric heating layer 3. The electric output of the pane is 318 W.

Figure 2C:
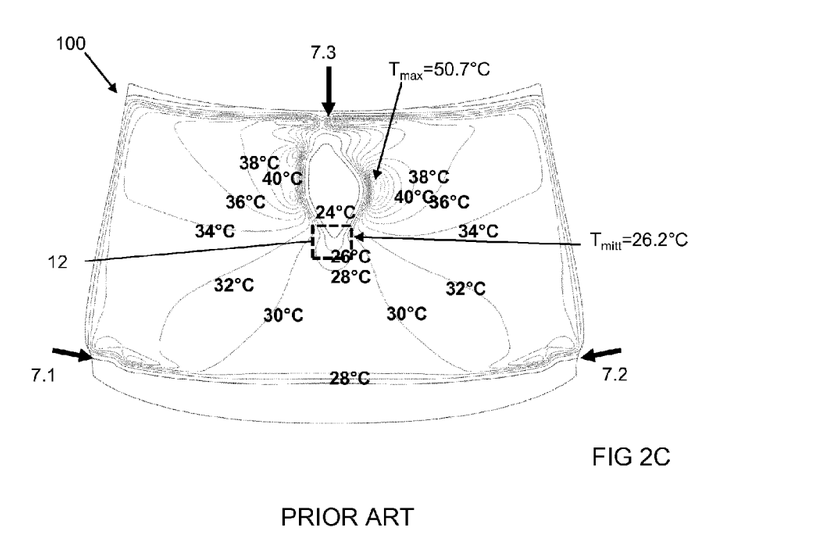

FIG. 2C depicts the simulation of the temperature distribution of the comparative example according to the prior art of FIG. 2A. The maximum temperature $T_{max}$ on the pane 100 is 50.7° C., the average temperature $T_{mitt}$ in the region 12 below the uncoated zone 8 is 26.2° C.

Figure 3A:
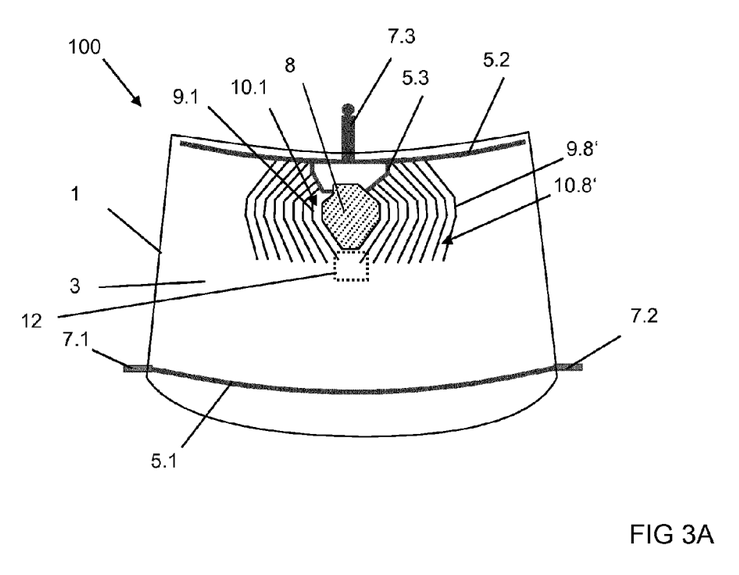

FIG. 3A depicts a plan view of another embodiment of a pane 100 according to the invention. The first pane 1, the second pane 2, the electric heating layer 3, the thermoplastic intermediate layer 4, and the external feed lines 7, 7.1, 7.2 are configured as in FIG. 2A. The electric heating layer 3 has an uncoated zone 8, which corresponds to that of FIG. 2A. A third busbar 5.3 is arranged in the upper region of the pane 100. Moreover, the electric heating layer 3 has in each case eight separating lines 9.1-9.8, 9.1'-9.8' on both sides of the uncoated zone 8. By means of the separating lines 9.1-9.8, 9.1'-9.8', eight segments 10.1-10.8, 10.1'-10.8' are formed on each of the two sides of the uncoated zone 8, through which the current path is guided from the busbar 5.2 or the third busbar 5.3 into the region below the uncoated zone 8. As the following simulations demonstrate, homogenization of the heating power distribution and of the temperature distribution of the pane 100 according to the invention can thus be obtained. The separating lines 9 are preferably introduced into the electric heating layer 3 by laser patterning. The width of the individual separating lines 9 is, for example, 100 µm, as a result of which the view through the pane 100 is only minimally affected.

Figure 3B:
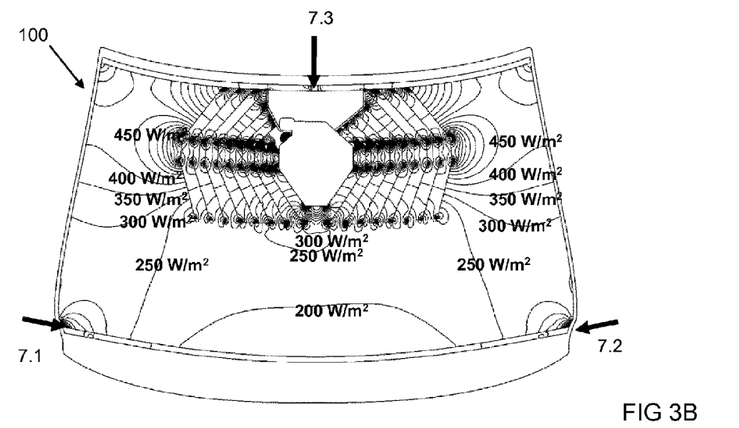

FIG. 3B depicts the simulation of the heating power distribution of the pane 100 according to the invention of FIG. 3A. The electrical output of the pane is 312 W.

Figure 3C:
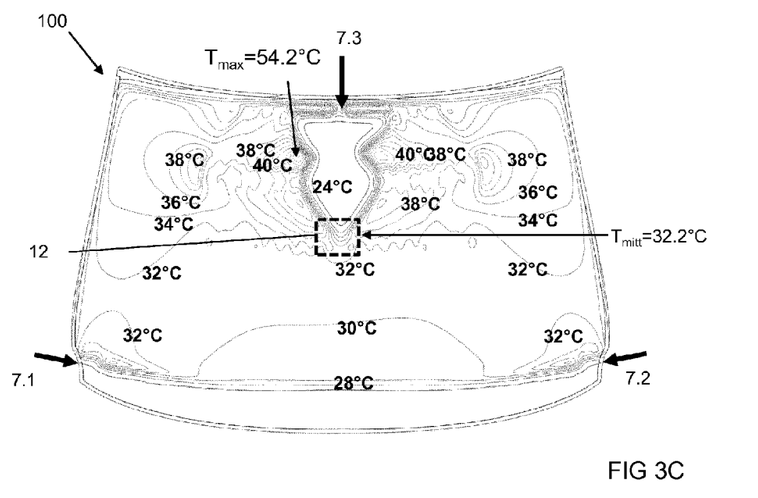

FIG. 3C depicts the simulation of the temperature distribution of the pane 100 according to the invention of FIG. 3A. The maximum temperature $T_{max}$ on the pane 100 is 54.2° C.; the average temperature $T_{mitt}$ in the region 12 below the uncoated zone 8 is 32.2° C.

Table 1 again summarizes the simulation results.

TABLE 1

| | Heating output in the region 12 below the uncoated zone 8 | Average temperature $T_{mitt}$ in the region 12 below the coating-free zone 8 | Heating output distribution |
|---|---|---|---|
| Comparative example of FIG. 2A (prior art) | <150 W/m² | 26.2° C. | Poor |
| Pane 100 according to the invention of FIG. 3A | >300 W/m² | 32.2° C | Good |

The pane 100 according to the invention of FIG. 3A shows clearly improved heating properties compared to the pane 100 according to the prior art of the comparative example of FIG. 2A. In particular, in the region 12 below the uncoated zone 8, the pane according to the prior art has only a heating power of <150 W/m² and an average temperature of roughly 26.2° C. The inhomogeneity of the heating power distribution results in an only unsatisfactory defrosting and defogging function of the pane 100. In the central field of vision in the region 12 below the uncoated zone 8, the heating properties do not suffice to ensure a problem-free view through the pane 100 in winter weather conditions.

The pane 100 according to the invention of FIG. 3A has improved heating properties in the critical region 12 below the uncoated zone 8. Thus, simulations yielded a heating power of more than 300 W/m² and heating to an average temperature of roughly 32.2° C. under the simulation conditions. The view through the pane is negatively affected only minimally because of the low width of the separating lines and satisfies the requirements for motor vehicle glazing.

This result was unexpected and surprising for the person skilled in the art.

Figure 4:
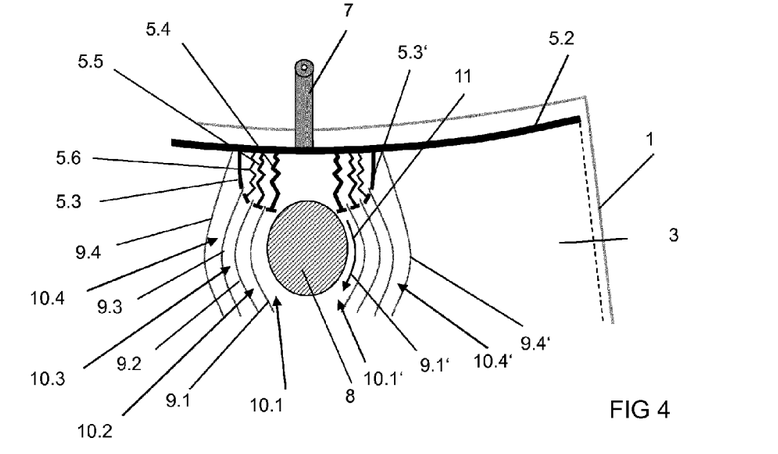

FIG. 4 depicts a plan view of a detail of another embodiment of a pane 100 according to the invention. The first pane 1 with the electric heating layer 3, the second pane 2, the thermoplastic intermediate layer 4, and the external feed lines 7, 7.1, 7.2 are configured as in FIG. 3A. The electric heating layer 3 has an uncoated zone 8 and separating lines 9.1-9.4, 9.1'-9.4', which subdivide the electric heating layer 3 into a plurality of segments 10.1-10.4, 10.1'-10.4'. The segments 10.1-10.4, 10.1'-10.4' are arranged in strip form on the sides of the uncoated zone 8. Moreover, each segment 10.1-10.4, 10.1'-10.4' has another busbar 5.3-5.6, 5.3'-5.6'. Each busbar 5.3-5.6, 5.3'-5.6' is electrically conductively connected directly to the busbar 5.2.

Due to the curvature of the segments 10.1-10.4, 10.1'-10.4', the current path 11 is lengthened through the respective segment 10.1-10.4, 10.1'-10.4'; and due to the constant specific sheet resistance of the electric heating layer 3, the ohmic resistance through the segment 10.1-10.4, 10.1'-10.4' is increased. This would result in an inhomogeneous heating power distribution compared to the current paths outside the segments 10.1-10.4, 10.1'-10.4' formed by the separating lines 9.1-9.4, 9.1'-9.4'. By a shortening of the length of the current path 11 through the segment 10.1-10.4, 10.1'-10.4' by means of another busbar 5.3-5.6, 5.3'-5.6' through which the current is fed into the segment 10.1-10.4, 10.1'-10.4', further homogenization of the heating power distribution and of the temperature distribution of the electrically heated pane 100 can be obtained. The length of the of the busbar 5.3-5.6, 5.3'-5.6' and its dimensions, such as thickness and width, can be determined in simple experiments and simulations. In the example depicted, the busbars 5.4-5.6, 5.4'-5.6' are configured in zigzag form, with the busbars 5.4, 5.4' configured thicker than the busbars 5.5, 5.5', and these, in turn, thicker than the busbars 5.6, 5.6'. The busbars 5.4, 5.4' have, as a result, lower resistance than the busbars 5.5, 5.5' and these, in turn, a lower resistance than the busbars 5.6, 5.6'.

Figure 5:
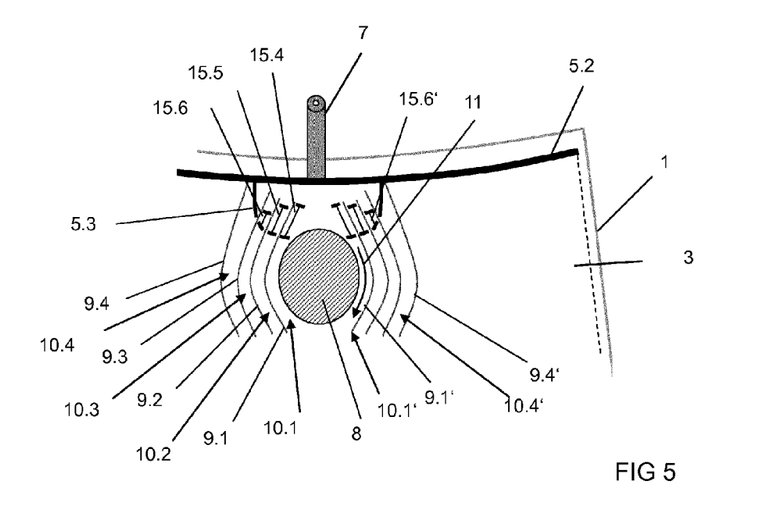

FIG. 5 depicts a plan view of another embodiment of a pane 100 according to the invention. The first pane 1 with the electric heating layer 3 and the external feed lines 7, 7.1, 7.2 are configured as in FIG. 4. The electric heating layer 3 has an uncoated zone 8 and separating lines 9.1-9.4, 9.1'-9.4', which subdivide the electric heating layer 3 into a plurality of segments 10.1-10.4, 10.1'-10.4'. The segments 10.1-10.4, 10.1'-10.4' are arranged in strip form on the sides of the uncoated zone 8. The segments 10.4 and 10.4', which are arranged farthest from the uncoated zone 8, have, in each case, a third busbar 5.3 and 5.3', which is electrically conductively connected directly to the busbar 5.2. Moreover, the other inward-positioned segments 10.1-10.3, 10.1'-10.3' have, in each case, a low-impedance bridge 15.4-15.6, 15.4'-15.6', which lowers the electrical resistance of the current path through the respective segment. The low-impedance bridges 15.4-15.6, 15.4'-15.6' are made, for example, from the material of the busbar 5.2 and have an electrical resistance with lower impedance than that of the electric heating layer 3. The low impedance bridges 15.4-15.6, 15.4'-15.6' are not connected electrically conductively directly to the busbar 5.2, but are electrically conductively connected over their full length to to the electric heating layer 3.

Due to the curvature of the segments 10.1-10.4, 10.1'-10.4', the current path 11 is lengthened through the respective segment 10.1-10.4, 10.1'-10.4'; and due to the constant specific sheet resistance of the electric heating layer 3, the ohmic resistance through the segment 10.1-10.4, 10.1'-10.4' is increased. This would result in an inhomogeneous heating power distribution compared to the current paths outside the segments 10.1-10.4, 10.1'-10.4' formed by the separating lines 9.1-9.4, 9.1'-9.4'. By a shortening of the length of the current path 11 through the low impedance bridges 15.4-15.6, 15.4'-15.6', further homogenization of the heating power distribution and of the temperature distribution of the electrically heated pane 100 can be obtained. The length of the low impedance bridges 15.4-15.6, 15.4'-15.6' and their optimum electrical resistance can be determined in simple experiments and simulations.

Figure 6:
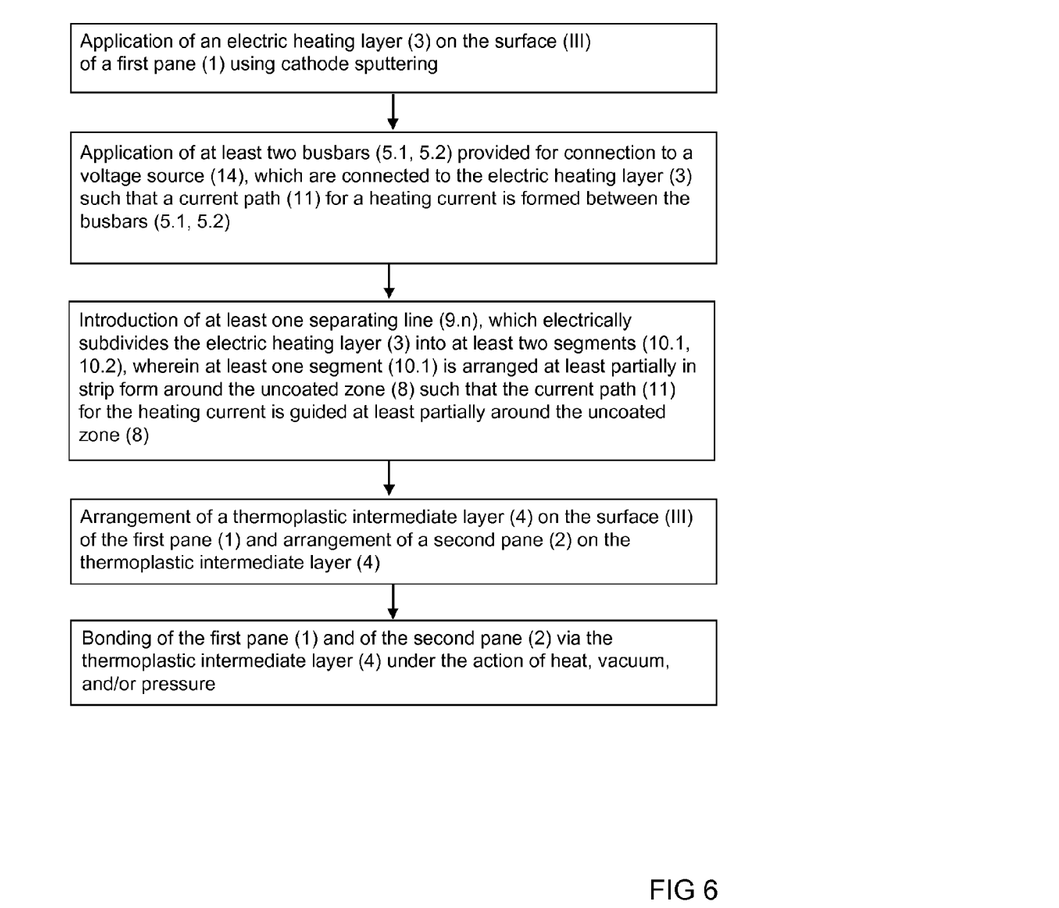

FIG. 6 depicts a flowchart of an exemplary embodiment of the method according to the invention for producing an electrically heatable pane 100.

It was possible to demonstrate that panes 100 according to the invention with separating lines present clearly improved heating properties, improved homogeneity of the heating power distribution, and a more uniform temperature distribution at relatively high temperatures in particularly important sections of the pane. At the same time, the view through the pane 100 is negatively affected only minimally by the separating lines according to the invention.

This result was unexpected and surprising for the person skilled in the art.

| List of Reference Characters: | | |
|---|---|---|
| (1) | first pane | |
| (2) | second pane | |
| (3) | electric heating layer, | |
| (4) | thermoplastic intermediate layer | |
| (5.1), (5.2), (5.3), (5.4), (5.5) | | busbar |
| (5.1'), (5.2'), (5.3'), (5.4'), (5.5') | | busbar |
| (6) | line | |
| (7) | feed line | |

| List of Reference Characters: | |
|---|---|
| (8) | uncoated zone |
| (9.1), (9.2), (9.3), (9.4), (9.5), (9.6), (9.7), (9.8) | separating line |
| (9.1'), (9.2'), (9.3'), (9.4'), (9.5'), (9.6'), (9.7'), (9.8') | separating line |
| (10.1), (10.2), (10.3), (10.4), (10.5), (10.6), (10.7), (10.8) | segment |
| (10.1'), (10.2'), (10.3'), (10.4'), (10.5'), (10.6'), (10.7'), (10.8') | segment |
| (11) | current path |
| (12) | region |
| (13) | connecting cable |
| (14) | voltage source |
| (15.4), (15.5), (15.6), (15.4'), (15.5'), (15.6') | low-impedance bridge |
| (100) | pane |
| (II) | surface of the second pane 2 |
| (III) | surface of the first pane 1 |
| b, $b_1$, $b_2$ | width of the segment 10, 10.1, 10.2 |
| d, $d_1$, $d_2$ | width of the separating line 9 |
| L, $L_1$, $L_2$ | length of the segment 10, 10.1, 10.2 |
| A-A' | section line |

The invention claimed is:

1. A pane having an electric heating layer, comprising:
a first pane having a surface;
at least one electric heating layer that is applied at least on part of the surface and includes an uncoated zone;
at least two busbars, including a first busbar and a second busbar, provided for connection to a voltage source, the at least two busbars being connected to the electric heating layer such that a current path for a heating current is formed between the at least two busbars; and
at least one separating line that electrically subdivides the at least one electric heating layer into at least two segments, the at least one separating line extending from the first busbar to a region below the uncoated zone and does not extend to the second busbar,
wherein at least one segment of the at least two segments is arranged in strip form around the uncoated zone such that the current path for the heating current is guided at least partially around the uncoated zone, and
wherein a third busbar is arranged in direct electrical contact with the first or second busbar and in electrical contact with the at least one segment, resulting in shortening an average length of the at least one segment.

2. The pane according to claim 1, wherein the electric heating layer has at least two separating lines, which form segments that are arranged at least partially in strip form around the uncoated zone.

3. The pane according to claim 1, wherein the electric heating layer has four to thirty separating lines, which form segments that are arranged at least partially in strip form around the uncoated zone.

4. The pane according to claim 1, wherein a width of each separating line is from 30 μm to 200 μm.

5. The pane according to claim 1, wherein a width of each separating line is from 70 μm to 140 μm.

6. The pane according to claim 1, wherein at least one of a width of each segment between the uncoated zone and a nearest separating line and a width between two adjacent separating lines is from 1 cm to 15 cm.

7. The pane according to claim 1, wherein the area of the uncoated zone is from 0.5 dm² to 15 dm².

8. The pane according to claim 1, wherein an average length of each segment deviates by less than 25% from a mean of the average length of each segment.

9. The pane according to claim 1, wherein an average length of each segment deviates from 0% to 5% from a mean of the average length of each segment.

10. The pane according to claim 1, wherein the third busbar is in electrical contact with all segments.

11. The pane according to claim 1, wherein a low-impedance bridge, which reduces an electrical resistance along the current path, is arranged in at least one segment.

12. The pane according to claim 11, wherein at least one of the at least two busbars and the low-impedance bridge is implemented as fired printing paste.

13. The pane according to claim 12, wherein the fired printing paste contains at least one of metallic particles, metal particles, and carbon particles.

14. The pane according to claim 12, wherein the fired printing paste has a specific resistance from 0.8 μohm·cm to 7.0 μohm·cm.

15. The pane according to claim 1, wherein the surface of the first pane is areally bonded to a second pane via a thermoplastic intermediate layer.

16. The pane according to claim 15, wherein at least one of the first pane and the second pane contains flat glass, float glass, quartz glass, borosilicate glass, soda lime glass, or a polymer.

17. The pane according to claim 1, wherein the electric heating layer is a transparent, electrically conductive coating.

18. The pane according to claim 17, wherein the electric heating layer has a sheet resistance from 0.4 ohm/square to 10 ohm/square.

19. The pane according to claim 18, wherein the electric heating layer contains silver, indium tin oxide, fluorine-doped tin oxide, or aluminum-doped zinc oxide.

20. A method for producing a pane having an electric heating layer, comprising:
applying an electric heating layer having an uncoated zone onto a surface of a pane;
connecting at least two busbars, including a first busbar and a second busbar, to the electric heating layer, the at least two busbars being configured for connection to a voltage source such that a current path for a heating current is formed between the busbars;
introducing least one separating line that electrically subdivides the electric heating layer into at least two segments, the at least one separating line extending from the first busbar to a region below the uncoated zone and does not extend to the second busbar, wherein at least one segment is arranged in strip form around the uncoated zone such that the current path for the heating current is guided at least partially around the uncoated zone; and arranging a third busbar in direct electrical contact with the first or second busbar and in electrical contact with the at least one segment, resulting in shortening an average length of the at least one segment.

21. The method according to claim 20, wherein introducing at least one separating line includes laser patterning.

22. A method of using a pane having an electric heating layer, comprising:

providing the pane having an electric heating layer of claim 16; and installing the pane in a means of transportation for travel on land, in the air, or on water.

23. The method according to claim 22, wherein installing the the pane includes providing the pane in at least one of a windshield, a rear window, a side window, and a roof pane of a motor vehicle.

24. A method of using a pane having an electric heating layer, comprising:

providing the pane having an electric heating layer of claim 1; and installing the pane as a functional individual piece or as a built-in component in furniture, a device, or a building.

25. A pane having an electric heating layer, comprising:

a first pane having a surface;

at least one electric heating layer that is applied at least on part of the surface and includes an uncoated zone;

at least two busbars, including a first busbar and a second busbar, provided for connection to a voltage source, the at least two busbars being connected to the electric heating layer such that a current path for a heating current is formed between the at least two busbars; and at least one separating line that electrically subdivides the at least one electric heating layer into at least two segments, the at least one separating line extending from the first busbar to a region below the uncoated zone and does not extend to the second busbar, wherein at least one segment of the at least two segments is arranged in strip form around the uncoated zone such that the current path for the heating current is guided at least partially around the uncoated zone, and wherein each of the at least two segments have a corresponding busbar, each corresponding busbar being in direct electrical contact with the first or second busbar.

* * * * *